April 7, 1925.
P. H. CLOOS, JR
1,532,173
COUPLING TIGHTENER BAR
Filed April 28, 1923
Fig. 1.
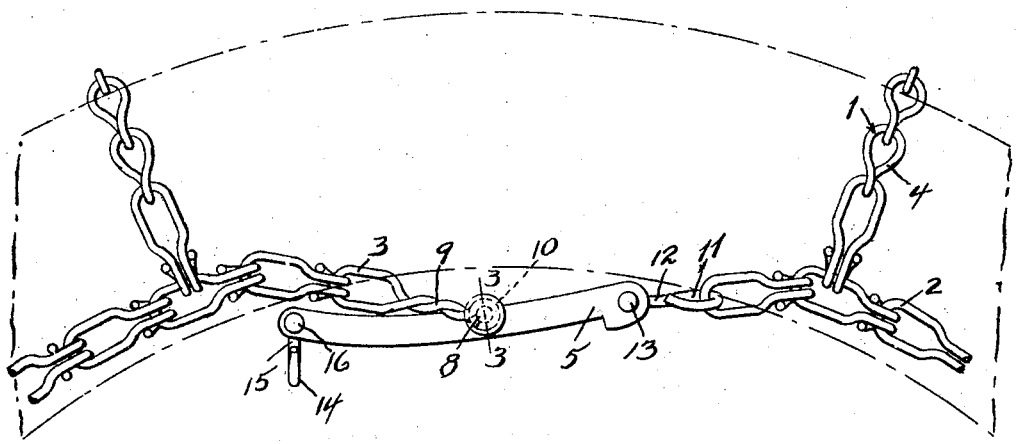
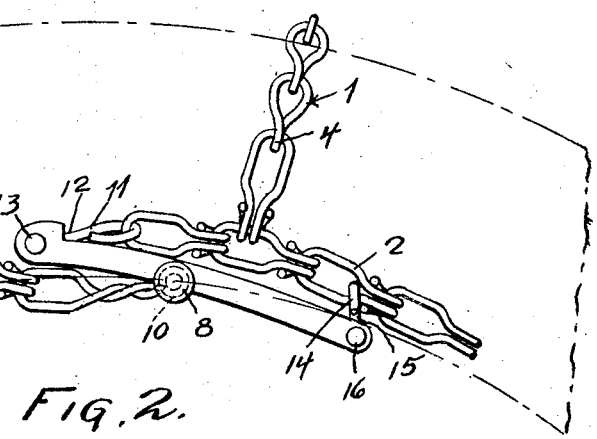
Fig. 2.
Fig. 3.
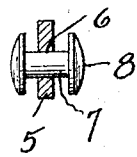
Inventor:
Peter H. Cloos Jr.

Patented Apr. 7, 1925.

1,532,173

UNITED STATES PATENT OFFICE.

PETER H. CLOOS, JR., OF WATERTOWN, SOUTH DAKOTA.

COUPLING-TIGHTENER BAR.

Application filed April 28, 1923. Serial No. 635,286.

*To all whom it may concern:*

Be it known that PETER H. CLOOS, Jr., a citizen of the United States, residing at Watertown, in the county of Codington and State of South Dakota, have invented certain new and useful Improvements in Coupling-Tightener Bars, of which the following is a specification.

This invention relates to improvements in coupling and tightening devices for tire chains and has as its object to provide a simple and inexpensive type of coupling which may be readily applied by any one to one end of the chain and adjustably connected with the other end of the chain and manipulated so as to draw the ends of the chain together and thus hold the chain snugly to the tire casing to which it is applied.

Another object of the invention is to provide a device for the purpose stated which may in itself be placed upon the market independent of the tire chains and sold at a low cost and applied by any one to any ordinary tire chain which is not equipped with connecting means for its ends or substituted for the usually unsatisfactory coupling means which are now present on such chains so as to obtain the advantages which are inherent in the present invention.

Another object of the invention is to provide a coupling and tightening device for tire chains of such construction that it may be readily manipulated to draw the ends of the chain together, and may be equally as readily locked in the adjusted position, the device being further so constructed as to preclude any likelihood of its becoming unlocked although it may be readily manipulated to permit of separation of the ends of the chain and removal of the chain from the tire.

In the accompanying drawings:

Figure 1 is a side elevation of the device embodying the present invention, the same being shown assembled with the ends of a tire chain and in position about to be manipulated to tighten and lock the chain;

Figure 2 is a similar view illustrating the device adjusted and locked in position to hold the chain to the tire;

Figure 3 is a detail vertical transverse sectional view taken substantially on the line 3—3 of Figure 1, the connected links of the tire chain being omitted from this view.

In the drawing, the numeral 1 indicates in general a tire chain with which the device of the present invention is to be associated, the longitudinal links of the chain being indicated by the numeral 2 and one of the end links being indicated by the numeral 3. The drawing illustrates only one side of the chain but it will be understood that there are, of course, two series of longitudinal links arranged one at each side of the chain and between which the cross chains 4 extend. Likewise it will be understood that there is one of the links 3 at each side of one end of the chain. The links 3 will presently be more specifically described.

The device embodying the invention comprises an arcuate lever bar indicated in general by the numeral 5. Intermediate its ends the said bar 5 is formed with an opening indicated by the numeral 6, and freely pivotally fitted through this opening is the shank 7 of a rivet 8, the shank of the said rivet, as shown in Figure 3, being of a length somewhat greater than the thickness of the lever bar 5. The said rivet 8 constitutes a means whereby the link 3 may be connected with the lever bar 5 so as to permit of pivotal movement of the said bar about the rivet 8 as a fulcrum. The link 3 has its side portions twisted together as indicated by the numeral 9 so as to provide a shank, and the terminal portions of the said side members are bent to provide eyes 10 which are disposed at opposite sides of the lever bar 5 and are pivotally engaged with the shank 7 of the rivet 8 between the heads of the said rivet and the adjacent faces of the said bar 5.

The numeral 11 indicates a hook having a shank 12 provided with a laterally turned terminal portion pivotally engaged through an opening in one end of the lever bar 5 and headed, as at 13, so as to be permanently assembled with the said bar for free pivotal movement. A similar hook, indicated by the numeral 14, is provided with a shank 15 which is connected in the same manner as above described, with the said end of the bar, as indicated by the numeral 16. The hooks are preferably so arranged that when properly applied to the chain, their bills will be presented outwardly. Referring now to Figure 1 of the drawings, it will be observed that the hook 11 is to be engaged with one or another of the links 2 of the side stretches of the chain, depending upon the distance to be spanned between the adjacent ends of the chain after it has been fitted as snugly as possible to the tire casing. With the hook 11 engaged in the manner stated, the lever 5 will extend substantially in the direction of extent of the chain stretch 2, the portion of the bar between the rivet 7 and the pivoted shank of the hook 11 extending substantially in a straight line between the ends of the chain stretch to be connected, and the other portion of the length of the bar extending beneath the link 3 as clearly shown in said Figure 1. The last mentioned end portion of the bar is now grasped and the bar is swung about the rivet 7 as a fulcrum and in the manner of a lever so as to draw the link 2 to which the hook 11 is connected, in the direction of the link 3, or, in other words, in the direction of the opposite end of the chain stretch and this movement is continued until the lever bar 5 has assumed substantially the position shown in Figure 2 of the drawings, in which position the first-mentioned end portion of the bar will lie above the link 3 and the last-mentioned end portion of the lever bar will lie beneath that end portion of the chain stretch to which the hook 11 is connected. In this manner the chain is tightened about the tire casing upon which it is arranged, and the hook 14 is then engaged with a conveniently located one of the links 2 beneath which the corresponding end portion of the lever bar extends, and the device is thus locked. Due to the fact that the bar 5 constitutes a lever and in the position assumed in Figure 2, is placed under a strain tending to swing it or return it to the position shown in Figure 1, a constant pull is exerted upon the hook 14 so that as a consequence the hook cannot become accidentally disengaged from the link 2 with which it is initially engaged, and there is therefore no likelihood of the chain coming loose from the tire.

Having thus described the invention, what is claimed as new is:

1. A coupler and tightener for tire chains comprising a lever bar, a fulcrum intermediate the ends of the bar for the connection of one end of the chain, a hook pivotally connected to the bar adjacent one end thereof and constituting means for the connection of the bar with the other end of the chain, and a hook freely pivotally connected to the bar adjacent the other end thereof and having a laterally presented bill for locking engagement with one of the links of the chain adjacent the last-mentioned end thereof when the lever bar has been swung about its fulcrum to draw the ends of the chain together.

2. A coupler and tightener bar for tire chains comprising a lever bar, a fulcrum intermediate the ends of the bar for the connection of one end of the chain thereto, a hook pivotally connected to the bar adjacent one end thereof, and constituting means for the connection of the bar with the other end of the chain, and a hook freely pivotally connected to the bar adjacent the other end thereof and at one side of the said bar for locking engagement with one of the links of the chain adjacent the last-mentioned end thereof when the lever bar has been swung about its fulcrum to draw the ends of the chain together, the said hook extending crosswise with relation to the plane of the bar whereby to engage the said chain from the side.

In testimony whereof I affix my signature.

PETER H. CLOOS, Jr. [L. S.]